Patented Nov. 1, 1949

2,487,004

UNITED STATES PATENT OFFICE 2,487,004

PREPARATION OF LOWER ALKYL (LOWER ALIPHATIC ACYL) AMINOCYANOACETATES

Benjamin F. Tullar, East Greenbush, N. Y., assignor to Sterling Drug Inc., Wilmington, Del., a corporation of Delaware No Drawing. Application May 10, 1947, Serial No. 747,334

5 Claims. (Cl. 260—465.4)

This invention relates to the preparation of lower alkyl (lower aliphatic acyl) aminocyanoacetates.

Esters of (lower aliphatic acyl) aminocyanoacetic acids are valuable intermediates in the synthesis of amino acids, for example, as described by Noel F. Albertson in J. A. C. S., 68, 450–453 (1946).

Cerchez and Colesiu, Comp. rend., 194, 1954–1956 (1932), prepared ethyl acetamidocyanoacetate by acetylating ethyl oximinocyanoacetate and reducing the acetylation product with aluminum amalgam. This method has a very serious drawback, however, in that ethyl oximinocyanoacetate is converted by acetylation into a mixture of O-acetyl and N-acetyl derivatives, of which only the latter will yield on reduction the desired ethyl acetamidocyanoacetate. As a result, this process does not produce satisfactory yields. In U. S. Patent 2,393,723, to B. F. Tullar, there is described a process for reductively acylating alkyl isonitrosocyanoacetates by treatment with a cold aqueous solution of a water-soluble metal hydrosulfite and a lower aliphatic acid anhydride.

I have now discovered that zinc, which has the advantages of being a cheap and readily available metal, can be employed as the reducing agent in a process for reductively acylating isonitrosocyanoacetic esters to yield acylaminocyanoacetic esters. This result is unexpected in view of the previously described behaviour of ethyl isonitrosocyanoacetate toward a reductive formylation wherein zinc was used as the reducing agent; thus Conrad and Schultze, Ber., 42, 736–737 (1909) did not obtain ethyl formamidocyanoacetate as the product of the treatment of ethyl isonitrosocyanoacetate with zinc and anhydrous formic acid, but instead obtained ethyl formamidomalonamate. Therefore, the reductive formylation of the isonitroso group was attended by the conversion of the cyano group to a carboxamido group. On the other hand, in my present process, the cyano group is unaffected by the reductive acylation, thus permitting preparation of the acylaminocyanoacetic ester.

My invention comprises treating a lower alkyl isonitrosocyanoacetate with a lower aliphatic acid, having the formula lower alkyl—COOH, the corresponding lower aliphatic acid anhydride and zinc, preferably zinc dust. The reaction proceeds according to the following equation:

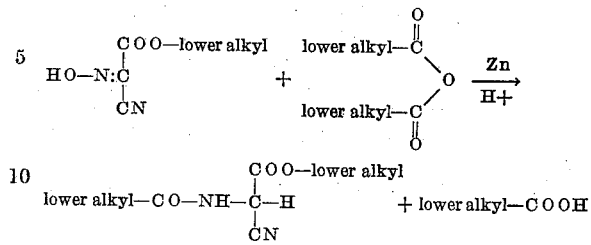

$$\text{lower alkyl}-CO-NH-\underset{\underset{CN}{|}}{\overset{\overset{COO-\text{lower alkyl}}{|}}{C}}-H + \text{lower alkyl}-COOH$$

The lower alkyl isonitrosocyanoacetates required as starting materials in my process are readily obtained by nitrosating the appropriate lower alkyl cyanoacetate, for example, with nitrous acid or other nitrosating agent known to those skilled in the art.

Although, for reasons of economy and convenience, I prefer to employ a mixture of acetic acid and acetic anhydride as the lower aliphatic acid-lower aliphatic acid anhydride mixture in my process, there may also be suitably used a mixture of propionic acid and propionic anhydride, a mixture of a butyric acid and the corresponding butyric anhydride, and other mixtures comprising lower aliphatic acids and the corresponding lower aliphatic anhydrides.

My invention is illustrated by the following example, without, however, being limited thereto.

Example 28.4 g. of ethyl isonitrosocyanoacetate is dissolved in a mixture of 150 ml. of acetic acid and 50 ml. of acetic anhydride. To this mixture is added portion-wise with strong stirring 30 g. of zinc dust during a period of about one hour, the temperature being maintained at 30–40° C. by external cooling. The reaction mixture is stirred for a further period of fifteen minutes and then the mixture is diluted with 200 ml. of warm water. The solution is filtered to remove a small amount of unreacted zinc and the filtrate is saturated with sodium chloride and cooled to 0° C. The white crystals which separate are collected on a filter, washed with a little cold water, and air-dried. This solid, which is ethyl acetamidocyanoacetate, weighs 22 g. and melts at 127–129° C. A further portion of 7 g. of ethyl acetamidocyanoacetate is obtained by extracting the mother liquor of the first crystallization with ethyl ether, evaporating the ether from the ether solution, and recrystallizing the residue from water or ethyl alcohol.

In the above example, when there is used, instead of the acetic acid-acetic anhydride mixture, a mixture of 175 ml. of propionic acid and 65 ml. of propionic anhydride or a mixture of 200 ml. of butyric acid and 80 ml. of butyric anhydride, there is obtained as the product, respectively, ethyl propionamidocyanoacetate or ethyl butyramidocyanoacetate.

When, instead of using ethyl isonitrosocyanoacetate as the starting material in the above examples, there is used methyl isonitrosocyanoacetate, isopropyl isonitrosocyanoacetate, or n-butyl isonitrosocyanoacetate, there is obtained as the product in each case the corresponding lower alkyl (lower aliphatic acyl) aminocyanoacetate, i. e., methyl acetamidocyanoacetate, methyl propionamidocyanoacetate, methyl butyramidocyanoacetate, isopropyl acetamidocyanoacetate, isopropyl propionamidocyanoacetate, isopropyl butyramidocyanoacetate, n-butyl acetamidocyanoacetate, n-butyl propionamidocyanoacetate, and n-butyl butyramidocyanoacetate.

I claim:

1. The process for preparing a lower alkyl (lower aliphatic acyl) aminocyanoacetate which comprises treating a lower alkyl isonitrosocyanoacetate with a mixture of a lower aliphatic acid having the formula lower alkyl—COOH, the corresponding lower aliphatic acid anhydride and zinc.

2. The process for preparing a lower alkyl (lower aliphatic acyl) aminocyanoacetate which comprises treating a lower alkyl isonitrosocyanoacetate with a mixture of acetic acid, acetic anhydride and zinc.

3. The process for preparing a lower alkyl (lower aliphatic acyl) aminocyanoacetate which comprises treating a lower alkyl isonitrosocyanoacetate with a mixture of propionic acid, propionic anhydride and zinc.

4. The process for preparing ethyl acetamidocyanoacetate which comprises treating ethyl isonitrosocyanoacetate with a mixture of acetic acid, acetic anhydride and zinc.

5. The process for preparing ethyl propionamidocyanoacetate which comprises treating ethyl isonitrosocyanoacetate with a mixture of propionic acid, propionic anhydride and zinc.

BENJAMIN F. TULLAR.

REFERENCES CITED

The following references are of record in the file of this patent:

UNITED STATES PATENTS

| Number | Name | Date |
| --- | --- | --- |
| 1,878,969 | Mills | Sept. 20, 1932 |
| 2,306,765 | Stiller | Dec. 29, 1942 |
| 2,393,723 | Tullar | Jan. 29, 1946 |

OTHER REFERENCES

Tingle et al.: "Am. Chem. J.," vol. 37 (1907), pp. 51, 52, 57, 58, 63, 64.

Auwers et al.: "Liebigs Annalen," vol. 369 (1909), pp. 210 and 229–230.